United States Patent [19]
Gauthier et al.

[11] Patent Number: 6,036,070
[45] Date of Patent: Mar. 14, 2000

[54] VEHICULAR CARGO CARRIER AND SUPPORT ATTACHMENT THEREFOR

[76] Inventors: Diane Blais Gauthier; Julie Gauthier, both of 45 Jean-Marc, Gatineau, Quebec, Canada, J8R 2S7; France Gauthier, 204 Chemin du Quai, Masson-Anger, Quebec, Canada, J8M 1L7

[21] Appl. No.: 09/129,384

[22] Filed: Aug. 5, 1998

[51] Int. Cl.[7] .................................................. B60R 9/06
[52] U.S. Cl. ........................ 224/527; 224/521; 224/526
[58] Field of Search ..................... 224/488, 518–527, 224/428, 430, 431, 433, 435

[56] References Cited

U.S. PATENT DOCUMENTS

| | | |
|---|---|---|
| D. 328,731 | 8/1992 | Smith et al. ........................ D12/157 |
| D. 346,779 | 5/1994 | Liscinsky ........................... D12/413 |
| 1,113,845 | 10/1914 | Stevens . |
| 1,648,211 | 11/1927 | Baker ................................. 224/526 X |
| 3,103,290 | 9/1963 | Perri . |
| 3,158,302 | 11/1964 | Dickerson . |
| 3,202,332 | 8/1965 | Walker . |
| 3,228,576 | 1/1966 | Gaukel .............................. 224/527 X |
| 3,381,835 | 5/1968 | Lee . |
| 4,465,423 | 8/1984 | Anderson .............................. 414/462 |
| 4,671,439 | 6/1987 | Groeneweg . |
| 4,744,590 | 5/1988 | Chesney ............................. 280/769 |
| 4,813,584 | 3/1989 | Wiley . |
| 4,856,686 | 8/1989 | Workentine . |
| 5,033,662 | 7/1991 | Godin . |
| 5,038,983 | 8/1991 | Tomososki . |
| 5,106,002 | 4/1992 | Smith et al. . |
| 5,114,165 | 5/1992 | Vogel . |
| 5,137,192 | 8/1992 | Sheridan et al. . |
| 5,190,195 | 3/1993 | Fullhart et al. . |
| 5,215,234 | 6/1993 | Pasley ................................ 224/527 X |
| 5,310,100 | 5/1994 | Liscinsky . |
| 5,330,084 | 7/1994 | Peters . |
| 5,423,566 | 6/1995 | Warrington et al. .............. 224/521 X |
| 5,439,151 | 8/1995 | Clayton ................................ 224/509 |
| 5,454,496 | 10/1995 | Sumida et al. ...................... 224/509 |
| 5,460,304 | 10/1995 | Porter et al. ..................... 224/527 X |
| 5,544,799 | 8/1996 | Didlake .............................. 224/502 |
| 5,547,116 | 8/1996 | Eckhart ............................... 224/509 |
| 5,586,702 | 12/1996 | Sadler ................................. 224/521 |
| 5,738,262 | 4/1998 | Andrini ............................ 224/526 X |

FOREIGN PATENT DOCUMENTS

2945274 A1  5/1981  Germany ............................ 224/527

Primary Examiner—Gregory M. Vidovich
Attorney, Agent, or Firm—Jones, Tullar & Cooper, PC

[57] ABSTRACT

A vehicular hitch-mountable cargo carrier is provided that comprises generally a closable carrier having incorporated therein a sleeve for receiving a post. The post forms part of a support which is attachable to a conventional trailer hitch assembly. The cargo carrier is, thus, easily mountable on and removable from the vehicle. The carrier may be provided with a drawer, rear/brake lights, and a lighted licence plate holder and may come in various configurations, depending on the intended purpose.

21 Claims, 15 Drawing Sheets

VEHICULAR CARGO CARRIER AND SUPPORT ATTACHMENT THEREFOR

FIELD OF THE INVENTION

The present invention relates to cargo carriers and, in particular, cargo carriers for vehicles which are associated with a vehicle's typical hitch system for external cargo handling.

BACKGROUND OF THE INVENTION

There have been numerous proposals for mounting an external cargo carrier on a vehicle in association with a vehicle hitch or similar structural arrangement at the rear of vehicles. There are significant advantages of mounting a cargo carrier behind the vehicle as opposed to atop the vehicle in the reduction of aerodynamic resistance and the avoidance of additional vehicle height which might be problematic in areas with restricted overhead clearance. However, while a roof top carrier is generally considered "out of the way" when it comes to most vehicular functions, a cargo carrier which is disposed at the rear of a vehicle seriously detracts from the access to the rear of the vehicle including the access to the trunk in cars and prevention of the opening of rear doors or hatches in vehicles such as vans.

In order to overcome access problems, two main solutions have evolved. The first is to have an easily removable carrier. However, many such devices provide a substantial structure which is attached to the vehicle whereupon removal of the carrier results in the substantial supporting structure remaining with the vehicle until it too is removed or being carried along with the carrier, making it significantly heavier and cumbersome to manoeuver. Such arrangements also tend to unnecessarily provide duplicate structure in both the support and the carrier. The second solution is to provide a swing-away structure on which the carrier is supported. While these arrangements function well they tend to be relatively expensive due to their complexity.

SUMMARY OF THE INVENTION

A light-weight, detachable, vehicular hitch-mountable cargo carrier is provided that comprises generally a closable carrier having incorporated therein a sleeve for receiving a post. The post forms part of a support which is attachable to a conventional trailer hitch assembly. The cargo carrier is, thus, easily mountable on and removable from the vehicle.

With the present invention, the so called supporting structure is contained within, or is integral with, the cargo carrier. This feature permits the carrier to be completely detached from the vehicle, leaving only nominal structure attached (which does not substantially hinder access to the vehicle). If the attachment structure is removed with the carrier, then it adds only a minor amount of weight or inconvenience to the carrier. The minimal internal structure is fabricated from light-weight materials and the shell is made from strong, light-weight fibre-glass or similar materials, resulting in an extremely light-weight cargo carrier. The nature of the external shell is such that it may be made in colors which coordinate with typical vehicle colors or which can be custom fabricated to match.

Accordingly, there is provided in one aspect of the invention, a cargo carrier and a support for attaching the cargo carrier to a vehicle having a hitch wherein the cargo carrier comprises:

an openable and closable external shell having an internal supporting structure, the internal supporting structure including a tubular sleeve having an open end which opens generally downwardly through the external shell, and wherein the support comprises:
a post section which extends generally upwardly from a first end of a generally horizontal extension section, the extension section having an opposite end which is rigidly attachable to said vehicle hitch, and the post section being sized slightly smaller than the tubular sleeve to enable said post section to be slidably received in the tubular sleeve when the cargo carrier is placed on the support.

Preferably, both the post and the receiving sleeve are provided with similar constant radius curvatures. The curvatures ergonomically facilitates placement and removal of the cargo carrier on the post since it reflects the natural motion of a person lifting, as compared with pure vertical lifting while standing, and it combines vertical and horizontal movement necessary to clear the cargo carrier from the post. The curve also increases the torsional rigidity or stiffness of the post for a given cross-section.

Accordingly, there is provided in a second aspect of the invention, a cargo carrier and a support for attaching the cargo carrier to a vehicle having a receiver-type hitch, wherein the cargo carrier comprises:

a main body for holding cargo articles therein and a lockable cover for the main body, the main body having an internal supporting structure which includes a curved, tubular sleeve, the sleeve having an open end which opens generally downwardly through a lower portion of the main body, and the sleeve being curved in a generally vertical plane with a constant radius of curvature, and the support comprises: a curved post section which extends generally upwardly from a first end of a generally horizontal extension section, the extension section having an opposite end which is rigidly attachable to the vehicle hitch, the post section being curved in the same plane with the same radius of curvature as the sleeve, and the post section being sized slightly smaller than said tubular sleeve to enable the curved post section to be slidably received in the curved tubular sleeve when the cargo carrier is placed on the support.

These and other features and advantages of the present invention will become more apparent from the following detailed description and the attached drawings.

DETAILED DESCRIPTION OF THE INVENTION

Figure 1:
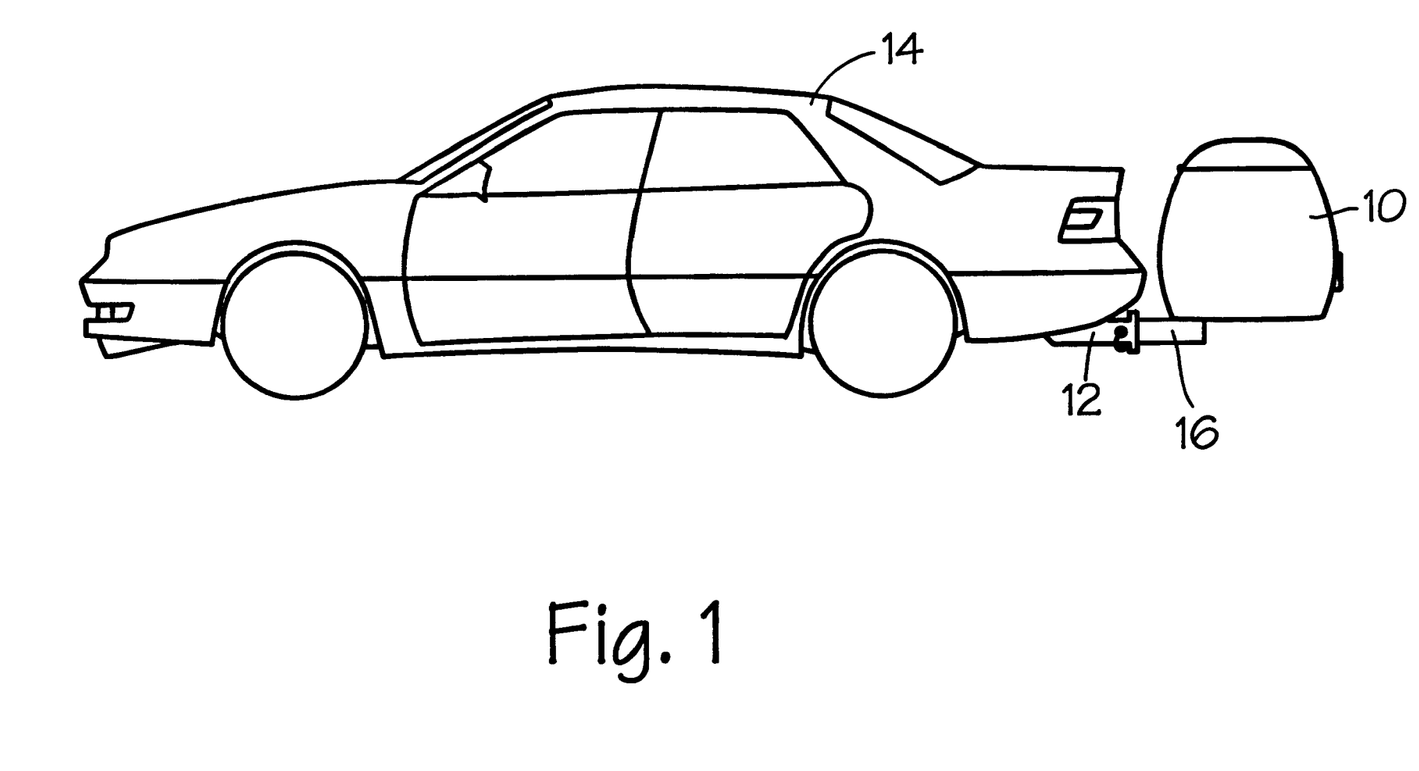
FIG. 1 is a side elevation showing an embodiment of a cargo carrier and its support in accordance with the present invention attached to the hitch of a vehicle.
Figure 2:
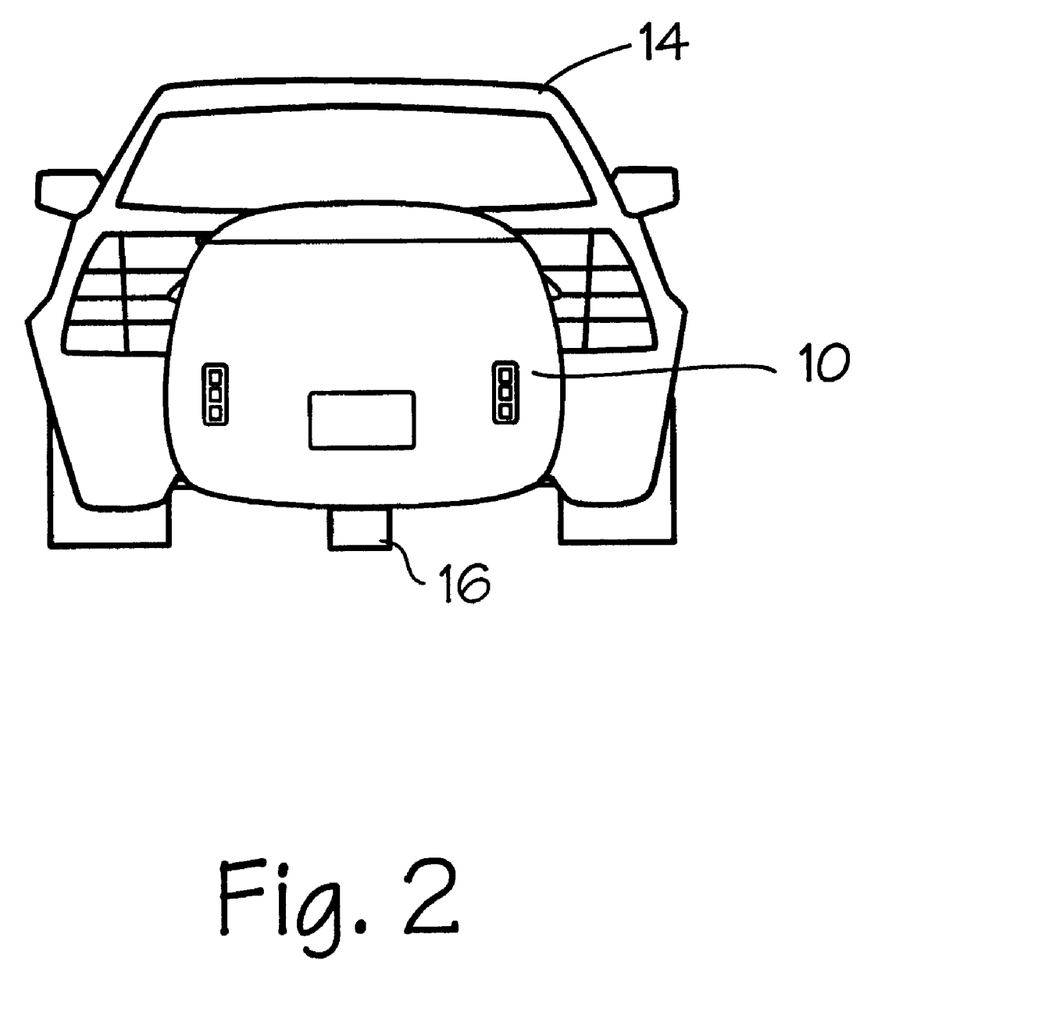
FIG. 2 is a rear view of the arrangement shown in FIG. 1.
Figures 3A, 3B:
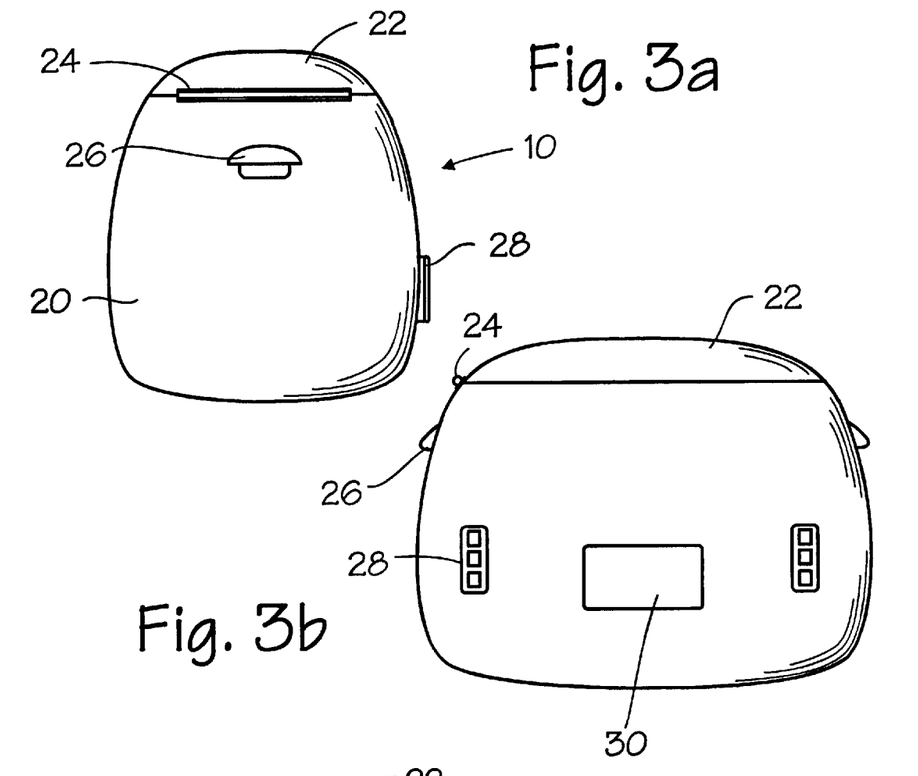
FIGS. 3a, 3b and 3c are side, rear and perspective views of the cargo carrier of FIG. 1.
Figure 3C:
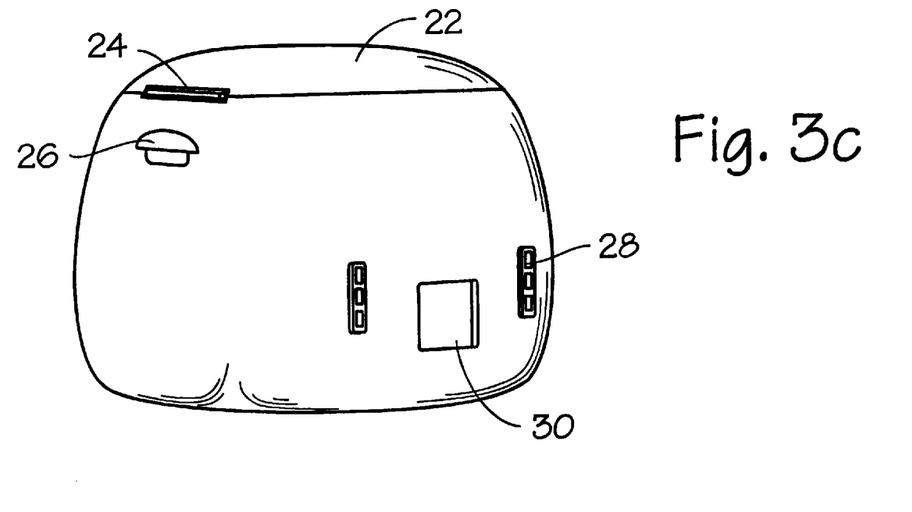

FIGS. 1 and 2 show, in general, the cargo carrier 10 attached to a conventional receiver-type hitch 12 of vehicle 14 by way of support 16. The cargo carrier 10 is shown in greater detail in FIGS.3a–3c and 4a–4c wherein it comprises in general a thin but relatively rigid external shell 18 preferably made from a fibreglass/resin material. Preferably, the material from which shell 18 is made is colored to coordinate with typical vehicle colors or can be custom colored to match specific vehicle's coloring. The cargo carrier 10 includes a main body portion 20 having a latching cover 22 attached thereto by hinge 24. A pair of handles 26 are provided on the sides of the body 20 at or near its top. The overall configuration of the cargo carrier 10 is that the body 20 and the cover 22 combine contiguously to form a closed compartment having a smoothly rounded (i.e. relatively aerodynamic) external surface. The cargo carrier 10 may also include a pair of tail/brake lights 28 connected to the tail light system of the vehicle via connector 29 (see FIG. 6) for synchronous operation and a licence plate holder 30 on the rear side of the body 20.

Figures 4A, 4B:
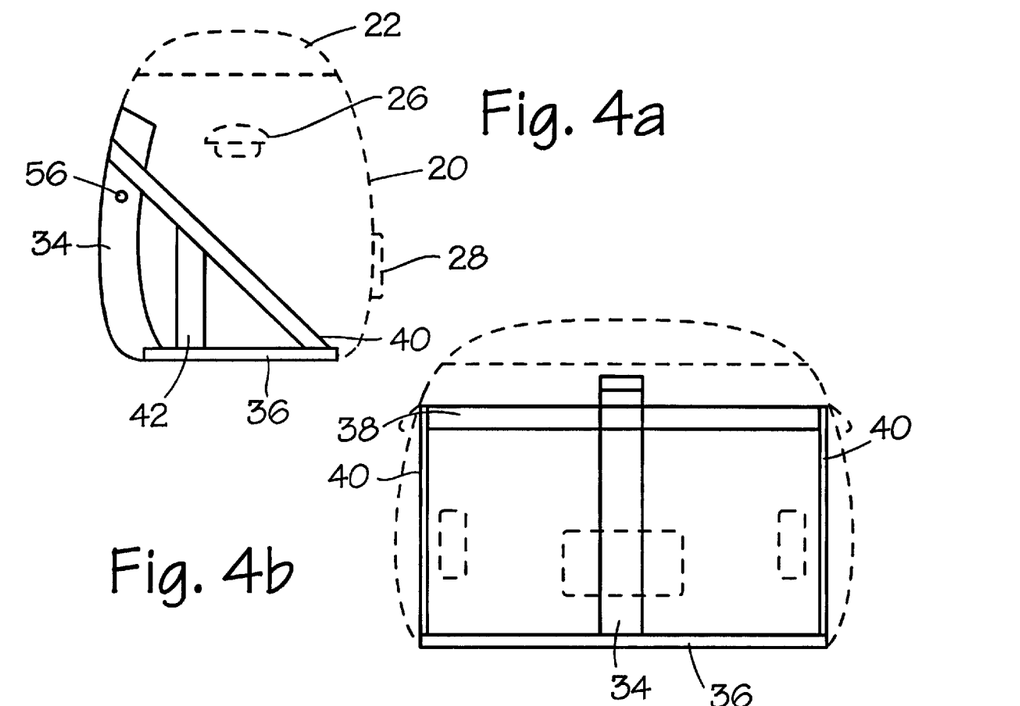
FIGS. 4a, 4b and 4c are side, rear and perspective views of the internal structure of the cargo carrier of FIGS. 3a–3c, with the cargo carrier shell shown in phantom.
Figure 4C:
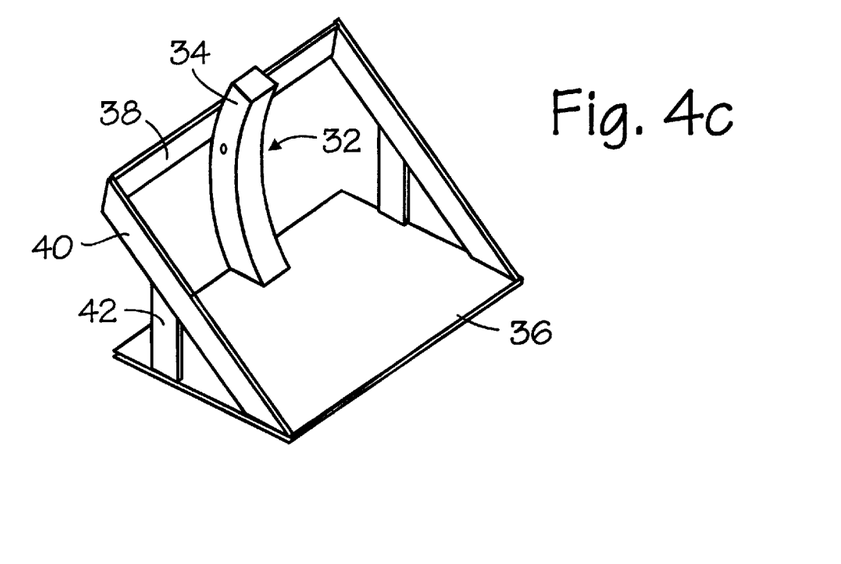

Inside the cargo carrier 10 there is provided an internal support structure or skeleton 32, preferably made of a light-weight, high-strength, and preferably weldable metal or other material. The internal support structure 32 includes a sleeve 34 that has an opening 35 at its lower end which opens generally downwardly through the external shell 18 of the cargo carrier 10. The sleeve 34 forms the backbone of the structural skeleton 32 and also serves as the medium by which the cargo carrier 10 is mounted on support 16 and, thereby, to hitch 12 of vehicle 14. The remainder of the internal support structure 32 serves to reinforce the shell 18 and to transfer the weight of the cargo carrier 10 and its contents to the sleeve 34.

The sleeve 34 is constructed or formed having a generally hollow, cross-section which is preferably square for ease of manufacture, although a variety of cross-sectional shapes such as rectangular, triangular, polygonal, cruciform, circular, elliptical or others could be employed. Preferably, the sleeve 34 is curved with a constant radius of curvature and generally in the vertical plane which dissects the cargo carrier 10 into right and left halves, i.e. the cross-sectional plane of FIG. 6.

Although the remainder of the internal support structure 32 could be of any suitable form, it preferably also comprises a plate 36 which is welded to the bottom of sleeve 34 and which serves as the floor of the cargo carrier 10. A cross-piece 38 is welded to the upper portion of sleeve 34 and extends across the inside upper front portion of the body 20. A pair of side support members 40 extend angularly downward from the extremities of the cross-piece 38 and are welded to the rear outer edges of plate 36. For additional reinforcement, a vertical brace members 42 is welded between near the front outer edge of the plate 36 and the respective side member 40. The main body 20 of the cargo carrier 10 may affixed to the internal supporting structure 32 at various locations by means of screws, bolts and/or similar fasteners or may be attached in a variety of other known manners.

Figure 5A:
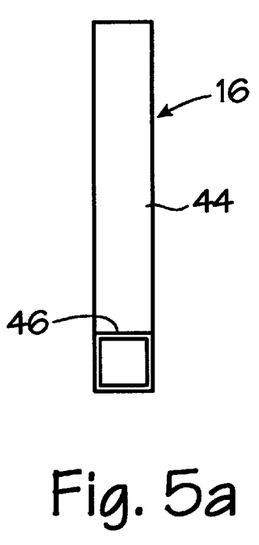
FIGS. 5a, 5b and 5c are front, side and rear elevations of one embodiment of the cargo carrier support designed for use with the cargo carrier of the FIG. 1.
Figure 5B:
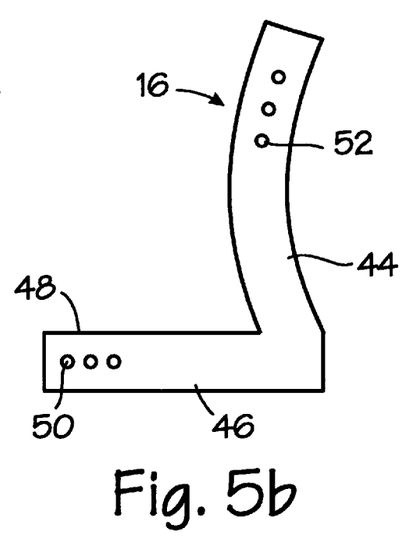
Figure 5C:
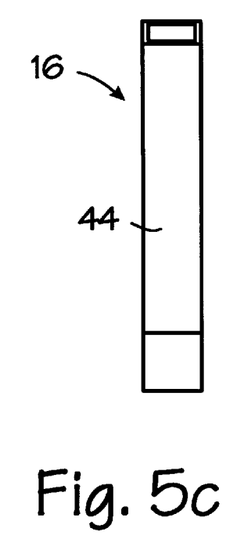
Figure 6:
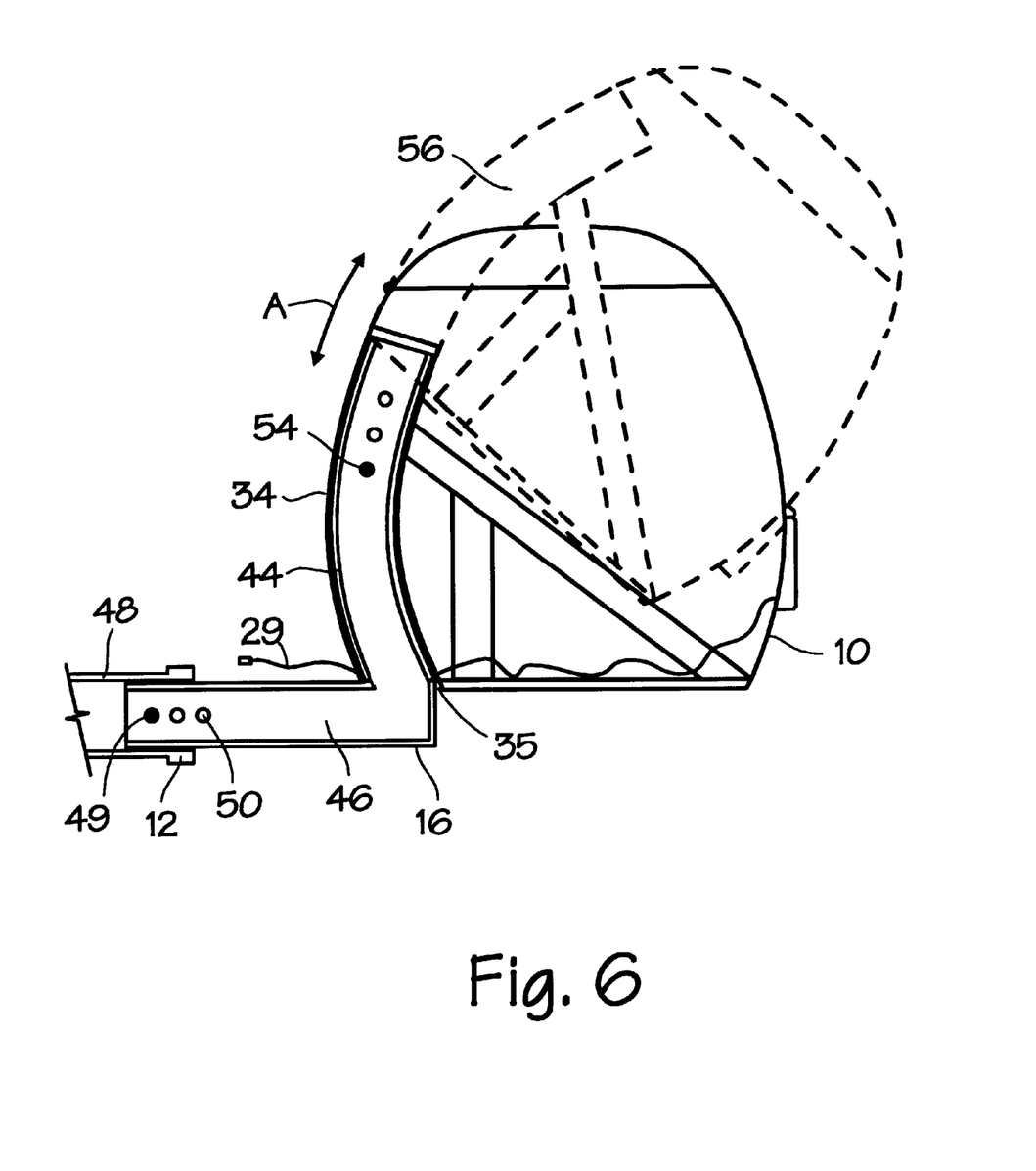
FIG. 6 is a cross-section of the cargo carrier of FIG. 1 showing the manner in which the cargo carrier is mounted on the support of Figs. 5a–5c and thereby attached to the vehicle's hitch.

FIGS. 5a–5c show the support 16 in greater detail. In general, the support 16 comprises a post section 44 which extends generally upwardly from a generally horizontal extension section 46, giving the support 16 an inverted 7 or L-shape. The end 48 of the extension 46 which is distal to the post 44 is adapted to be rigidly connectable to a conventional receiver-type vehicular hitch 12, as shown in FIG. 6. The hitch 12 is generally in the form of an open-ended square tube of a standardized size. The end 48 of the extension 46 is sized so that is can be slidably received within the hitch 12 to a predetermined depth. A pin 49 is insertable through a transversely-extending hole in the hitch 12 and through one of a plurality of transversely-extending holes 50 in the end 48 of the extension 46 to secure the extension 46 and, hence support 16, rigidly within the hitch 12. In addition to locking the pin which secures the support 16 to the hitch 12 to guard against its inadvertent removal or dislodgement, a secondary or redundant safety device such as a chain can be used to maintain the connection in the event the pin fails.

The post 44 is sized slightly smaller that the sleeve 34 but is provided with the same constant radius of curvature as that of the sleeve 34 to permit the sleeve 34 to be easily slid over, and removed from, the post 44. The expression "sized slightly smaller" as used herein means that the post 44 is provided with an external cross-sectional configuration which can be contained within the internal cross-sectional configuration of the sleeve 34 without significant relative rotation therebetween. Preferably the external cross-section of the post 44 has a similar but slightly scaled-down configuration as the internal cross-section of the sleeve 34. The curvature enables the cargo carrier 10 to be removed from the post 44 using a motion that more closely mimics the human lift motion at that height which would be generally more of a pivot that a vertical lift as can be seen by arrow A in FIG. 6. The curvature also increases the torsional rigidity or stiffness of the post 44 which significantly reduces vibration of the cargo carrier 10 about the generally vertical axis of the post 44, and/or which permits the use of a wider (left-to-right) cargo carrier. The post 44 preferably curves back over a portion of the extension section 46 (i.e. toward the rear of the vehicle) to enable the center of gravity of the cargo carrier to be closer to the point of connection and possibly over a portion of the extension section, thereby reducing the bending moment forces therein.

The post 44 is provided with a plurality of transversely-extending holes 52 which enable the cargo carrier 10 to be selectively positioned on the post by another pin 54 inserted through a transversely-extending hole 56 in sleeve 44 and then locked therein. The holes 52 in post 34 are located such that one of the holes 52, when aligned with hole 56 in the sleeve, results in the cargo carrier 10 being disposed in a level orientation. The plurality of holes 52 in the post 44 enables the height of the cargo carrier 10 to be varied to an extent limited by the vertical spacing of the holes 52 to take advantage of aerodynamics (i.e. matching the height of the cargo carrier 10 to that of the vehicle's trunk) or to lower the cargo carrier 10 so that it does not obstruct the driver's rear view.

Figure 7A:
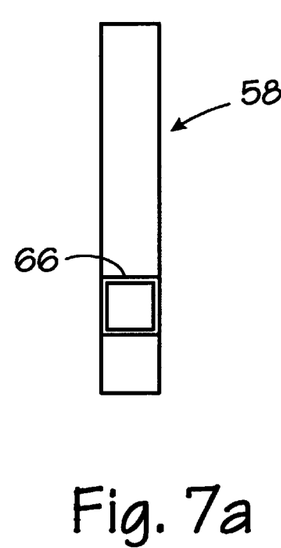
FIGS. 7a, 7b and 7c are front, side and rear elevations of another embodiment of the cargo carrier support designed for use with the cargo carrier of FIGS. 3a–3c.
Figure 7B:
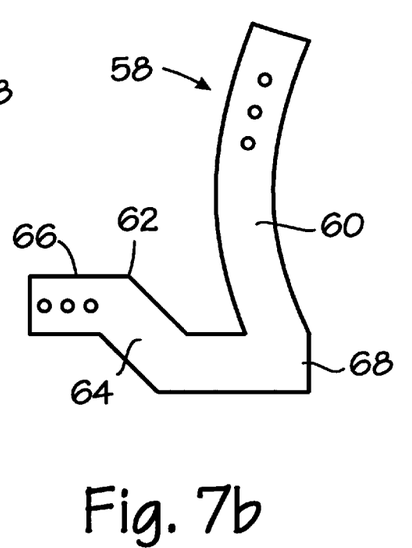
Figure 7C:
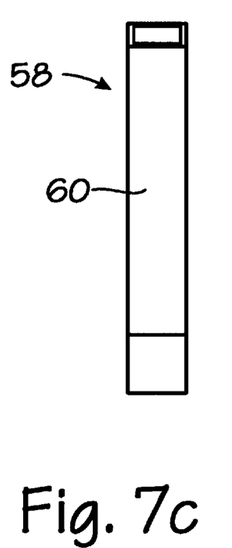
Figure 8:
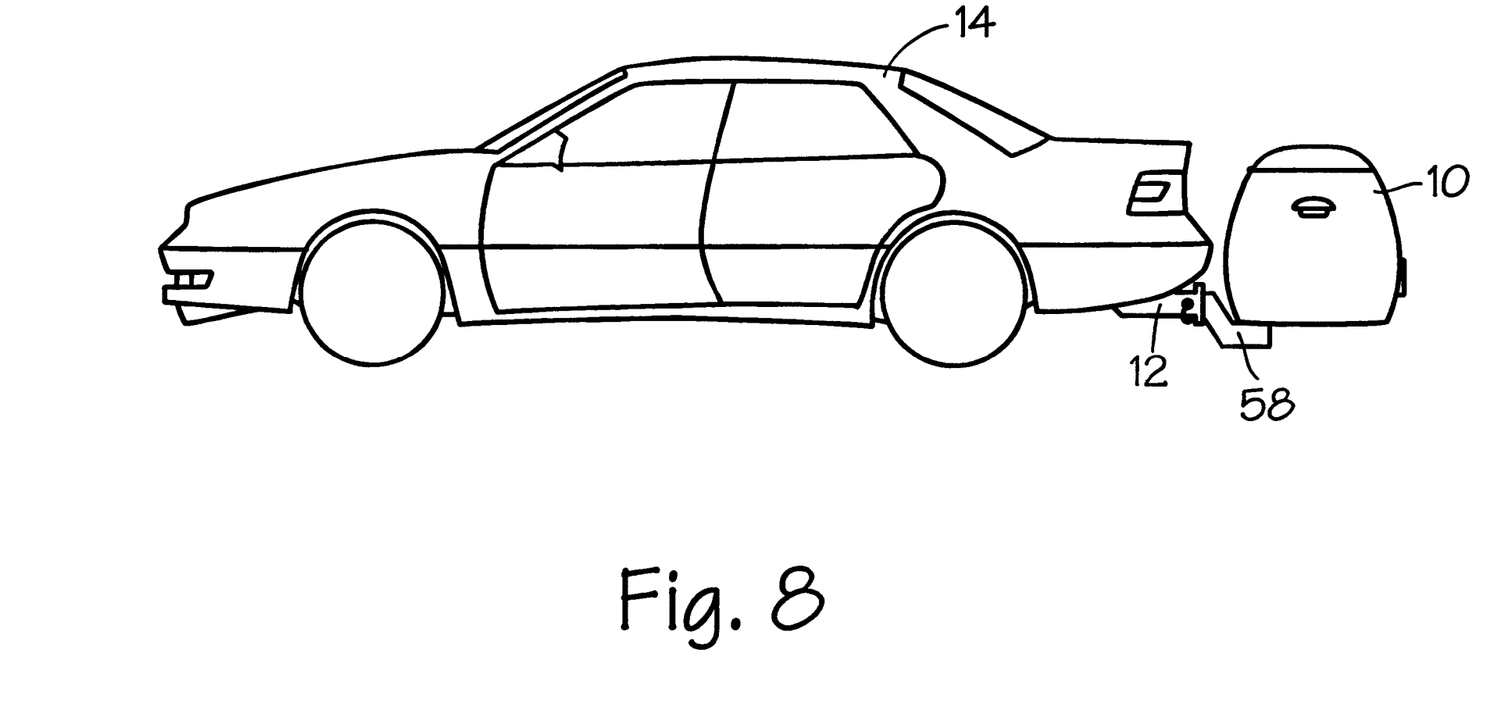
FIG. 8 is a side elevation of the cargo carrier of FIGS. 3a–3c as attached to the hitch of a vehicle with the support of FIGS. 7a–7c.
Figures 9A, 9B:
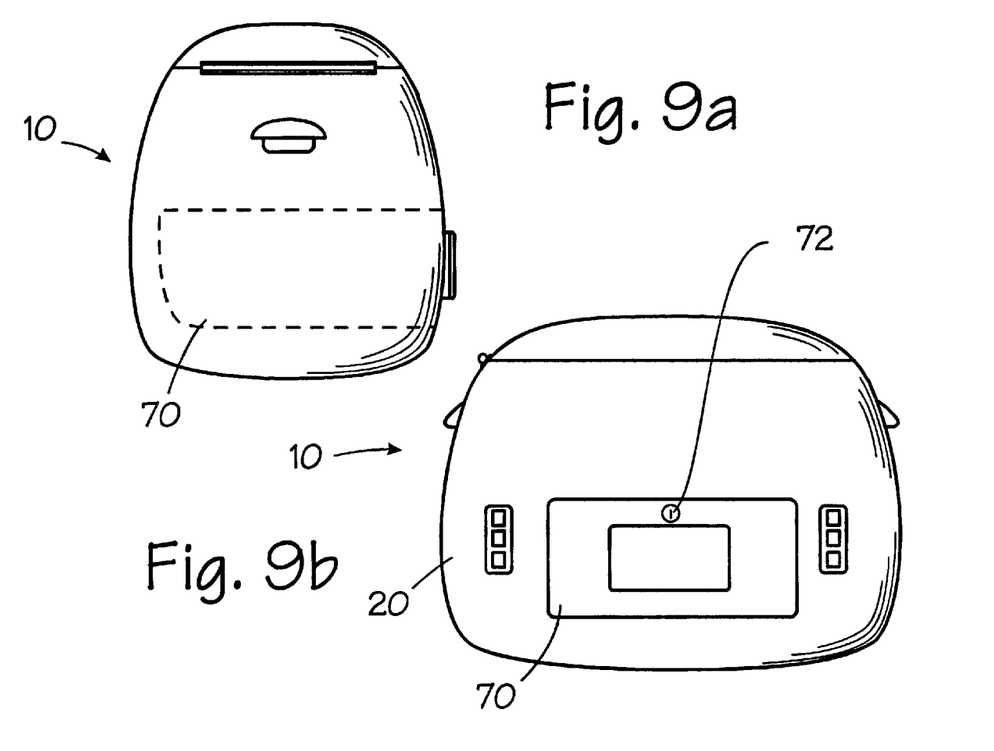
FIGS. 9a, 9b and 9c are side, rear and perspective views of the cargo carrier of FIG. 1, but which includes a rearwardly opening drawer therein.
Figure 9C:
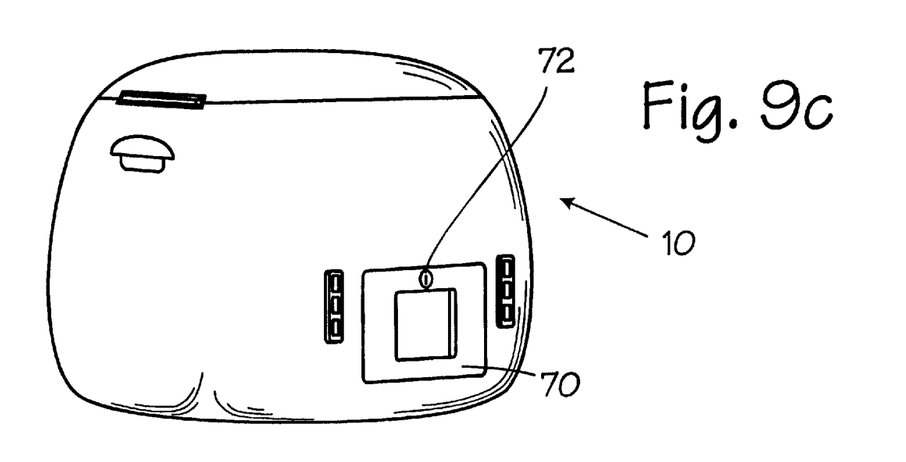
Figures 10A, 10B:
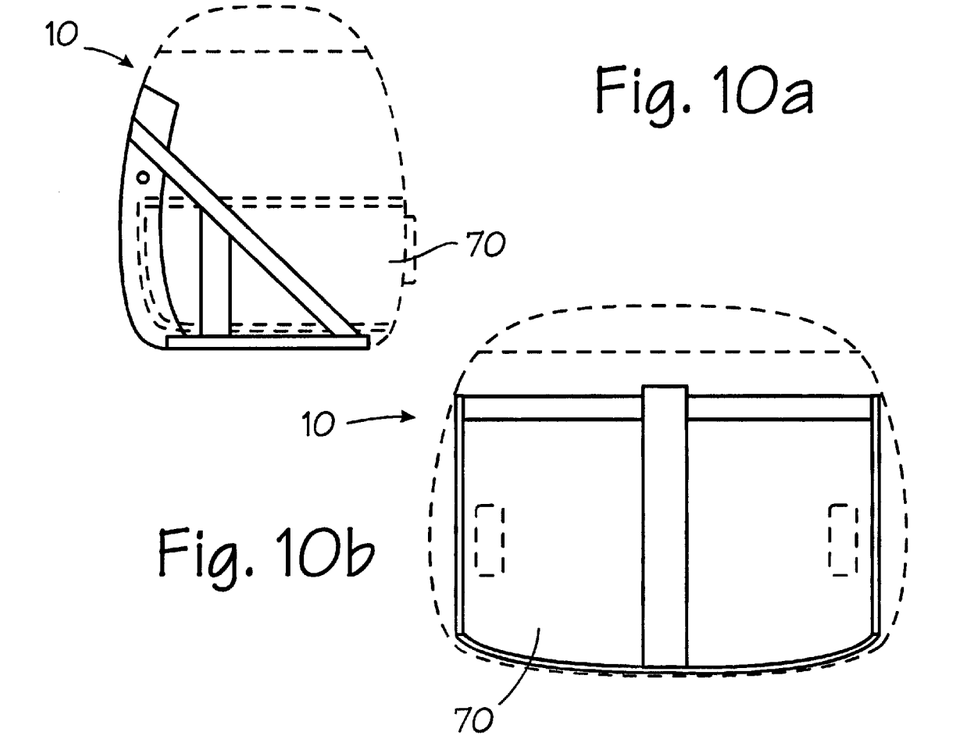
FIGS. 10a, 10b and 10c are side, rear and perspective views of the internal structure of the cargo carrier of FIGS. 9a–9c, with the cargo carrier shell shown in phantom.
Figure 10C:
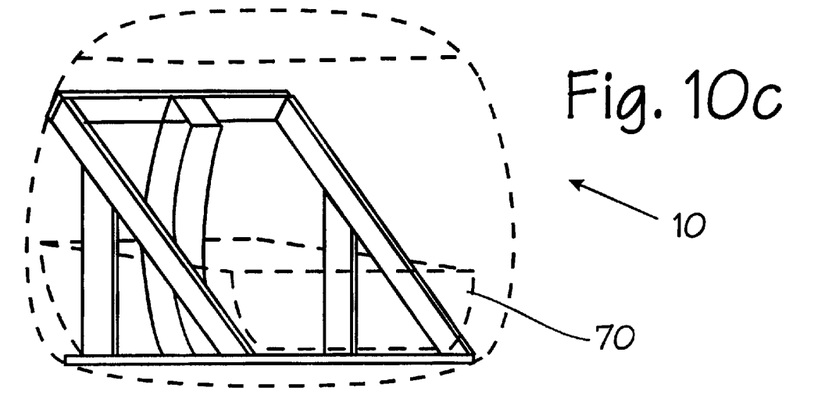
Figure 11:
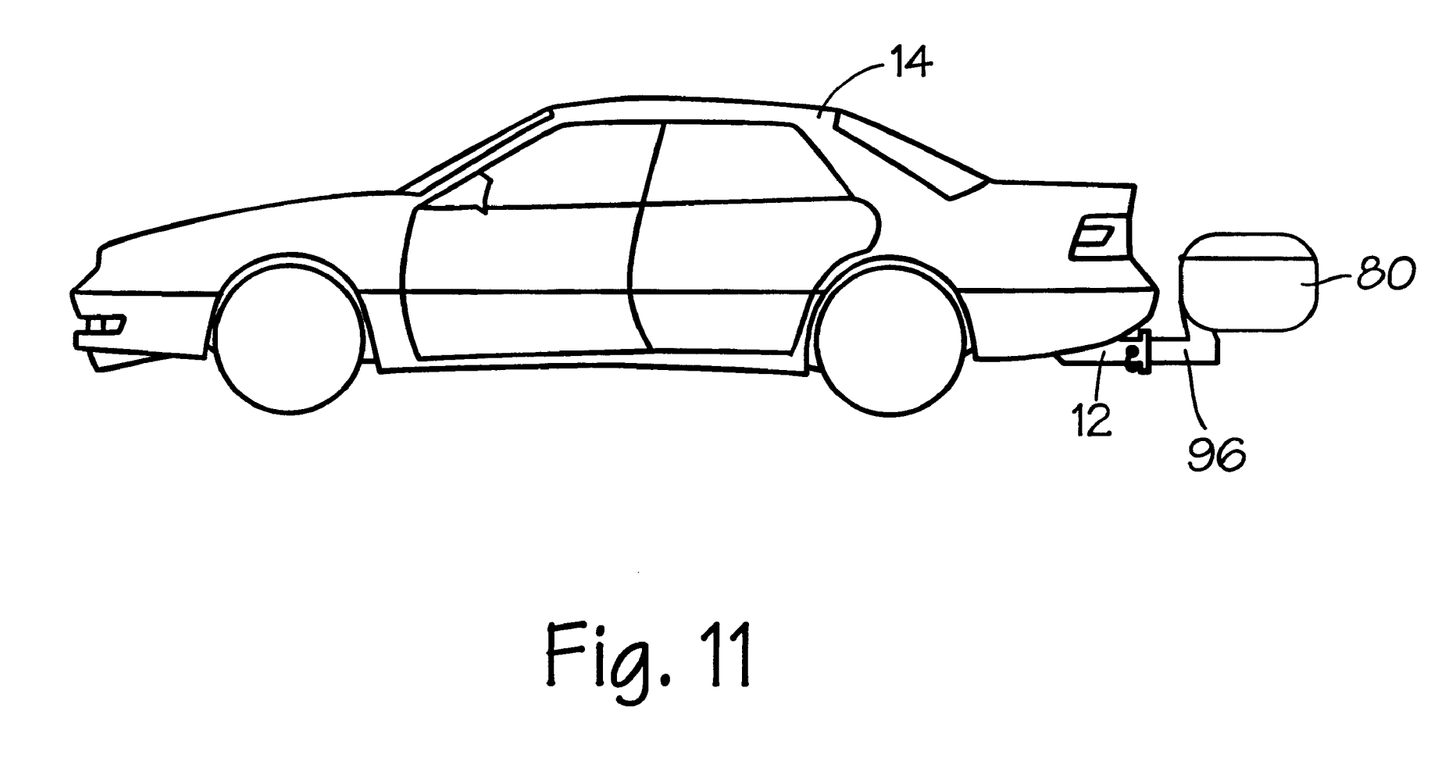
FIG. 11 is a side elevation of cargo carrier in accordance with the present invention adapted to carry skis and attached to the hitch of a vehicle.

Since it is likely more important not to impair the driver's view than are the aerodynamic considerations, alternate support 58 has been contemplated (see FIGS. 7a–7c) which will enable the minimum height to which the cargo carrier 10 will extend to be reduced. While the post section 60 is generally the same as the post section 44 of the support 16, the extension section 62 includes a downward step 64 between the distal end 66 of the extension 62 which attaches to the hitch 12 and the proximal end 68 from which the post 60 extends. FIG. 8 shows the cargo carrier 10 used in conjunction with the alternate support 58 which, as can been seen in comparison with FIG. 1, lowers the height to which the cargo carrier 10 extends.

FIGS. 9a to 9c and 10a to 10c illustrate a modification to the cargo carrier 10 in which a sliding drawer 70 is provided in the lower portion of the body 20. The drawer is openable by means of a lock mechanism 72.

FIGS. 11 to 17 show a variation of the cargo carrier and its associated support structure. In this case, the cargo carrier 80 is more cigar-shaped than the cargo carrier 10 and while being generally adapted to carry elongated items such as skis, may be used to carry a variety of sundry items. FIGS. 13a to 13c show the ski carrier 80 in more detail. The ski carrier 80 comprises a smooth-surfaced shell 82 having a lower body portion 84 and a closable cover 86 therefor. The cover 86 is attached to the body 84 by means of a transversely-extending hinge 88 which permits the cover 86 to open pivotably as shown in FIG. 13c.

Figure 14A:
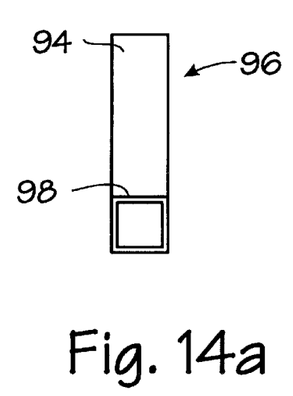
FIGS. 14a, 14b and 14c are front, side and rear elevations of the support designed for use with the ski carrier of FIGS. 13a–13c.
Figures 14B, 14C:
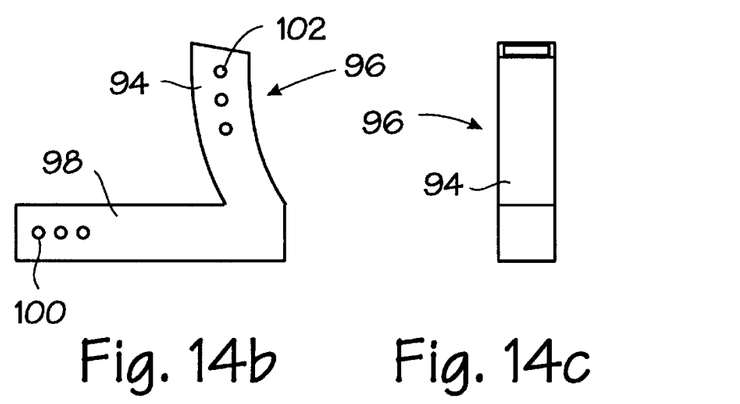
Figure 15:
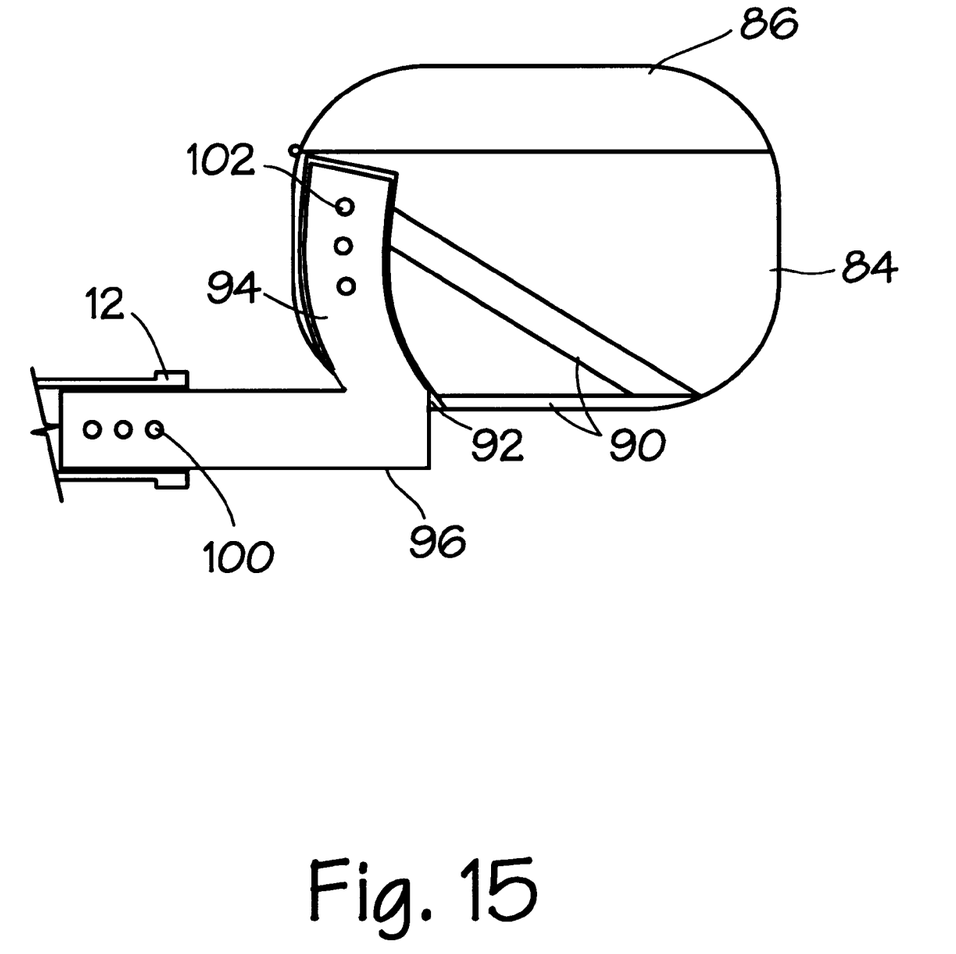
FIG. 15 is a cross-sectional view of the ski carrier of FIG. 11 showing the manner in which the ski carrier is mounted on the support of FIGS. 14a–14c.

The ski carrier 80 has an internal structure 90 similar to the internal structure 32 of the cargo carrier 10. The internal structure includes a sleeve 92 which is adapted to receive the post 94 of support 96. Preferably, both the sleeve 92 and the post 94 are curved and have the same radius of curvature and similar cross-sectional configurations. Due to the much lower profile of the ski carrier 80, the associated support 96 includes a shorter post section 94 curving upwardly from the extension section 98, as shown in FIG. 14b. FIG. 15 shows the manner in which the sleeve 92 receives the post 94 and the manner in which the support 96 is rigidly connected to the hitch 12. Holes 100 in the extension section 98 permit the support to be secured within the receiver-type hitch 12 of vehicle 14 in the same manner as aforesaid. Likewise, holes 102 provide the capability of securing the ski carrier 80 on the support post 94 at different heights.

Figure 12:
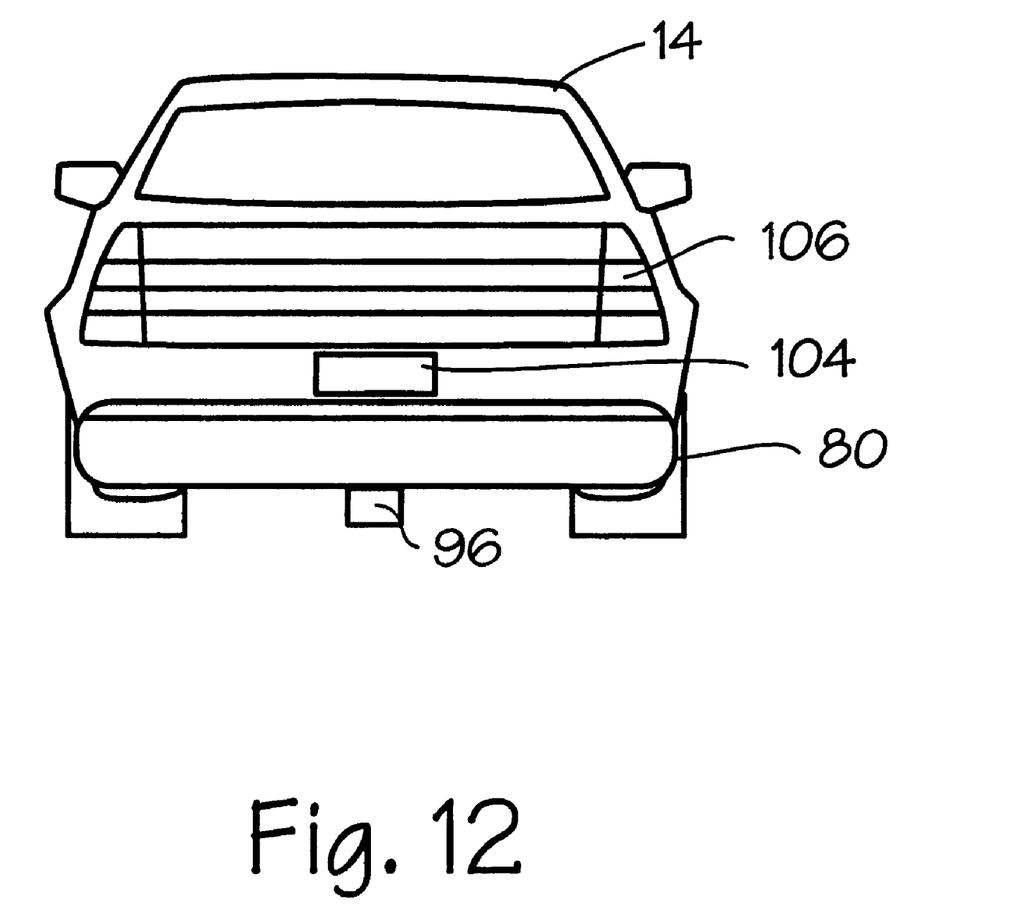
FIG. 12 is a rear view of the ski carrier arrangement of FIG. 11.
Figures 13A, 13B, 13C:
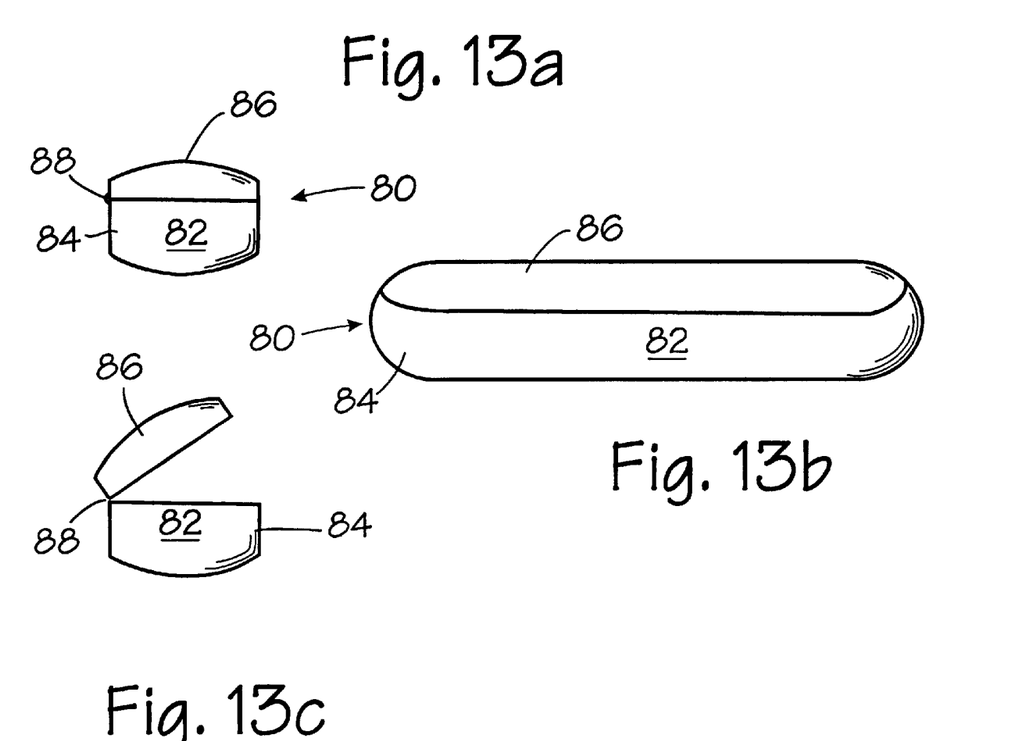
FIGS. 13a and 13b are side and rear elevations of the ski carrier of FIG. 11.
FIG. 13c is a side elevation of the ski carrier of FIG. 11 showing the manner in which it opens.
Figure 16A:
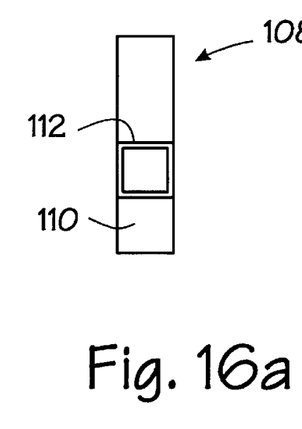
FIGS. 16a, 16b and 16c are front, side and rear elevations of another embodiment of the ski carrier support designed for use with the ski carrier of FIGS. 13a–13c.
Figures 16B, 16C:
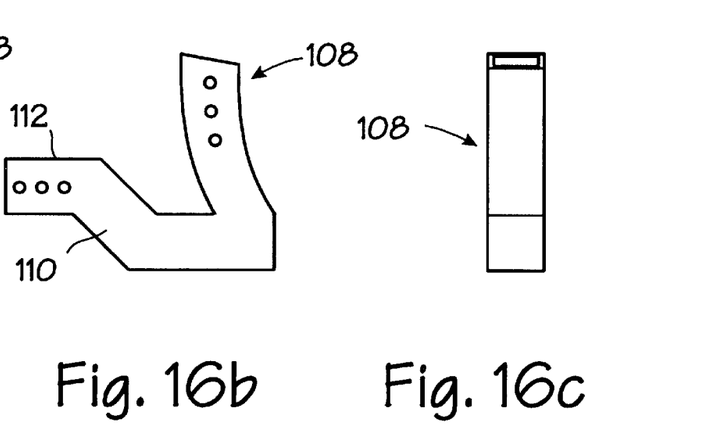
Figure 17:
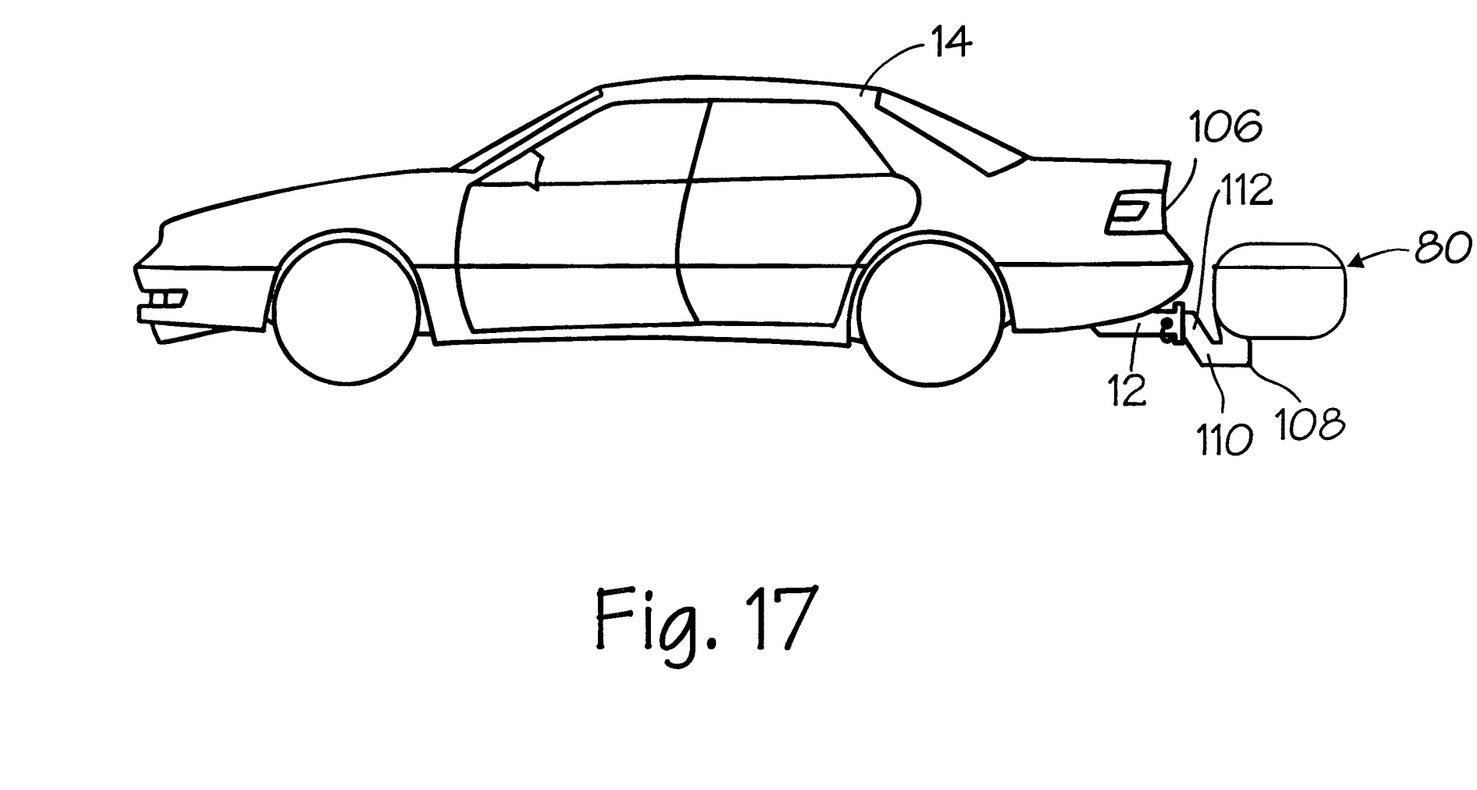
FIG. 17 is a side view of the ski carrier of FIGS. 13a–13c as attached to the hitch of a vehicle with the support of FIGS. 16a–16c.

One of the advantages of the low-profile carrier 80 is that it need not necessarily be provided with a licence plate holder or brake/tail lights because the carrier can be positioned so as to not obstruct the license plate 104 or the brake/tail light assembly 106 of vehicle 14 as shown in FIG. 12. However, due to the wide variation in vehicles in the locations of the licence plate 104 and tail/brake lights, it is contemplated that the support could be modified to compensate therefor. In this regard, FIGS. 16a to 16c and FIG. 17 show a support 108 along the lines of the support 58 in which a step 110 is provided in the extension section 112. Although the step 110 as shown in FIGS. 16a and 16b is downward resulting in a decrease in the height to which the ski carrier 80 can be positioned (as can be seen by comparing FIG. 17, which shows the use of support 108, with FIG. 11, which shows use of support 96 having a straight extension 98), the step could be upwardly directed if an increase in the maximum height of the ski carrier 80 were desired.

While there has been shown and described herein specific embodiments of the cargo carrier and its associated support for attaching the cargo carrier to a vehicle, it will be understood that various modifications and substitutions may be made thereto without departing from the spirit and scope of the invention as defined in the appended claims.

We claim:

1. A cargo carrier and a support for attaching the cargo carrier to a vehicle having a hitch, said cargo carrier comprising:

an openable and closable external shell having an internal supporting structure, said internal supporting structure including a tubular sleeve having an open end which opens generally downwardly through said external shell, and said support comprising:

a post section which extends generally upwardly from a first end of a generally horizontal extension section, said extension section having an opposite end which is rigidly attachable to said vehicle hitch, said post section being sized slightly smaller than said tubular sleeve to enable said post section to be slidably received in said tubular sleeve when said cargo carrier is placed on said support.

2. The cargo carrier and support of claim 1, wherein said tubular sleeve has an internal cross-sectional configuration and wherein said post section has an external cross-sectional configuration, said external cross-sectional configuration enabling said post section to be retained within said tubular sleeve without substantial relative rotation therebetween.

3. The cargo carrier and support of claim 2, wherein the external cross-sectional configuration of the post section is substantially the same but slightly smaller than the internal cross-sectional configuration of the sleeve.

4. The cargo carrier and support of claim 3, wherein the internal cross-section of the sleeve and the external cross-section of the post section are both square.

5. The cargo carrier and support of claim 1, further comprising means for locking said cargo carrier onto said post section.

6. The cargo carrier and support of claim 5, wherein said locking means comprises at least one transversely-extending hole through said post section which, when said cargo carrier is placed on said post section, is registrable with at least one transversely-extending hole through said sleeve permitting a lock pin to be inserted through both said transversely-extending holes.

7. The cargo carrier and support of claim 6, wherein a series of transversely-extending holes is provided in said sleeve and/or in said post section to enable the extent to which the sleeve is slidably positioned on said post section to be varied.

8. The cargo carrier and support of claim 1, wherein said extension section of said support includes a downward step between said opposite end and said first end to enable said cargo carrier to be disposed lower with respect to the vehicle.

9. The cargo carrier and support of claim 1, wherein said sleeve is curved in a generally vertical plane with a constant radius of curvature and wherein said post section is curved in said plane with the same radius of curvature.

10. The cargo carrier and support of claim 1, wherein said external shell comprises a body portion and a locking cover hingedly attached thereto to enable said cargo carrier to be openable and closable.

11. The cargo carrier and support of claim 1, further comprising handle means provided on said external shell to enable said cargo carrier to be lifted and placed on said post section of said support.

12. The cargo carrier and support of claim 1, wherein said cargo carrier is provided with tail lights and means for associating said tail lights with the vehicle tail lights for synchronous operation therewith.

13. The cargo carrier and support of claim 1, wherein said cargo carrier is provided with a licence plate holder.

14. The cargo carrier and support of claim 1, wherein said cargo carrier is provided with a lockable drawer.

15. The cargo carrier and support of claim 1, wherein said hitch is a receiver-type hitch in which said opposite end of said extension section of said support is lockingly received therein.

16. The cargo carrier and support of claim 15, wherein said opposite end of said extension section is lockingly retained in said receiver-type hitch by means of a lock pin which is lockingly insertable through a transversely-extending hole in said hitch and a corresponding one of a series of transversely-extending holes in said extension section.

17. The cargo carrier and support of claim 15, further comprising secondary locking means for providing redundant locking of said extension section to said hitch.

18. The cargo carrier and support of claim 1, wherein the cargo carrier is cigar-shaped for accommodating elongate articles.

19. The cargo carrier of claim 1, wherein the shell is colored to match the color of the vehicle.

20. A cargo carrier and a support for attaching the cargo carrier to a vehicle having a receiver-type hitch, said cargo carrier comprising:

a main body for holding cargo articles therein and a lockable cover for said main body, said main body having an internal supporting structure which includes a curved, tubular sleeve, said sleeve having an open end which opens generally downwardly through a lower portion of said main body, and said sleeve being curved in a generally vertical plane with a constant radius of curvature, and said support comprising:

a curved post section which extends generally upwardly from a first end of a generally horizontal extension section, said extension section having an opposite end which is rigidly attachable to said vehicle hitch, said post section being curved in said same plane with the same radius of curvature as said sleeve, and said post section being sized slightly smaller than said tubular sleeve to enable said curved post section to be slidably received in said curved tubular sleeve when said cargo carrier is placed on said support.

21. The cargo carrier and support of claim 20, wherein said curved tubular sleeve has an internal cross-sectional configuration and wherein said curved post section has an external cross-sectional configuration, said external cross-sectional configuration of the curved post section being substantially the same but slightly smaller than the internal cross-sectional configuration of the curved sleeve.

* * * * *